2,411,323

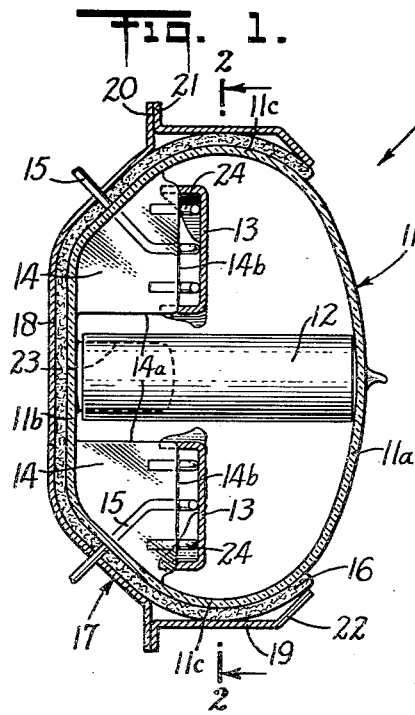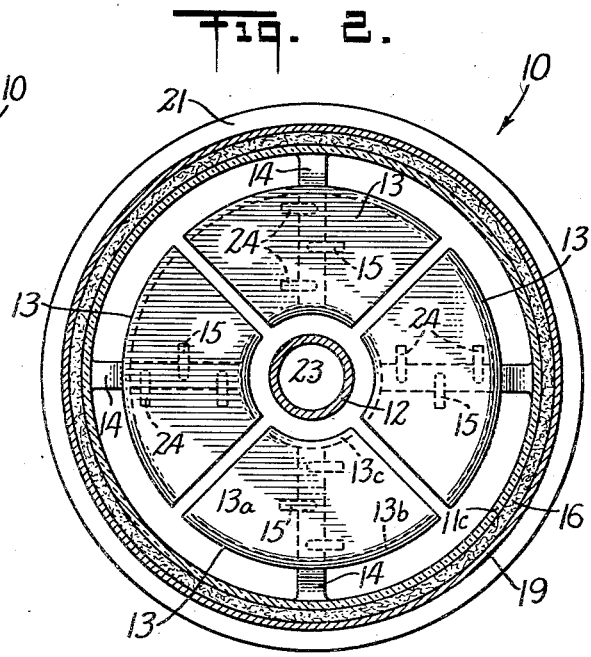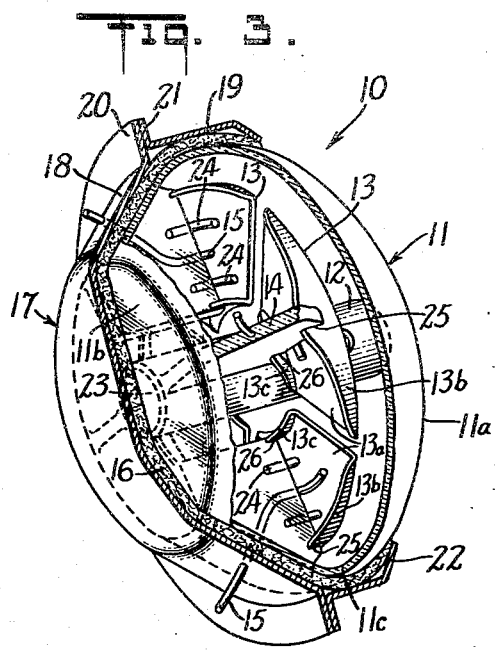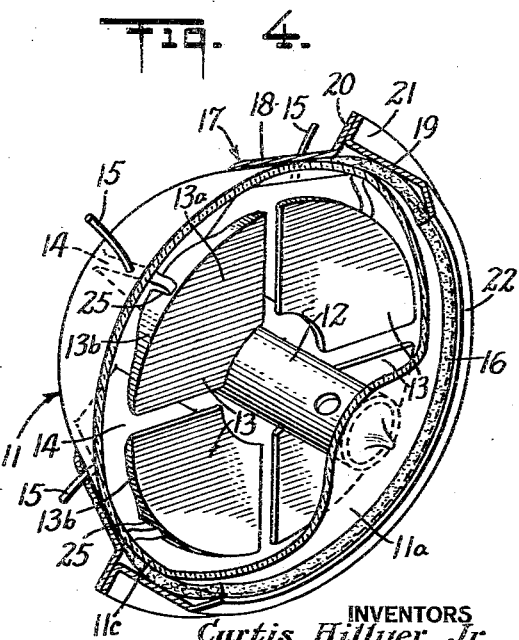
INVENTORS
Curtis Hillyer, Jr.
Henry Blackstone
BY Blair, Curtis & Hayward
ATTORNEYS Patented Nov. 19, 1946

UNITED STATES PATENT OFFICE 2,411,323

LIGHT SENSITIVE DEVICE

Curtis Hillyer, Jr., and Henry Blackstone, Richmond Hill, N. Y.

Original application September 7, 1940, Serial No. 355,708. Divided and this application March 6, 1941, Serial No. 381,950

10 Claims. (Cl. 250—165)

This invention relates to a light sensitive device, and more particularly to a photo-emissive tube of the gas filled alkali metal cathode type.

Tubes of the character under consideration are inherently frangible and are often used in the control circuits of various types of devices which, because of their nature, or because of the conditions under which they are used, often subject the tube to excessive shock or vibration. Phototubes are inherently delicate in structure, and conventional tubes are unable to withstand the forces resulting from such shocks and vibration, and either are immediately put out of commission thereby, or deteriorate rapidly thereunder, or have their sensitivity affected to such an extent as to ruin their response. Phototubes, furthermore, occasionally must be so installed that because of the inertia of their glass envelopes they are subject to fracture through their inability to resist forces applied perpendicularly thereto. Still other tubes, particularly those having a plurality of cathodes, are unable to stand up under strains induced by shock and vibration, by reason of the tendencies of the cathodes to crumble or bend as their inertia resists the applied forces. It is accordingly one of the objects of this invention to provide a phototube which is strong and durable, and accordingly capable of withstanding sudden jarring shocks, or continued excessive vibration. Other objects will be in part apparent and in part pointed out hereinafter.

The invention accordingly consists in the features of construction, combinations of elements and arrangements of parts as will be exemplified in the structure to be hereinafter described and the scope of the application of which will be indicated in the following claims.

In the drawing, wherein there is shown one embodiment of our invention,

Figure 1 is a sectional elevation of the phototube;

Figure 2 is a sectional elevation taken along the line 2—2 of Figure 1;

Figure 3 is a rear perspective view of the phototube, portions thereof being broken away; and, Figure 4 is a front perspective view of the phototube, certain portions thereof being broken away.

Similar reference characters refer to similar parts throughout the various views of the drawing.

This application is a division of our application Serial No. 355,708, filed September 7, 1940.

With reference to Figure 1, our phototube, which is generally indicated at 10, comprises a glass envelope generally indicated at 11, within which is disposed an anode 12 and a plurality of cathodes 13, respectively seated on and secured to glass pinches or supports 14, preferably formed integral with and extending from the bottom and sides of glass envelope 11 (see Figure 3). An insulated conductor 15 extends through each of glass supports 14, and is electrically connected to the cathode supported thereon (Figure 1).

Referring back to Figure 1, envelope 11 is preferably mushroom-shaped so that the top 11a thereof is substantially flat and has a wide angle of view to permit maximum illumination of cathodes 13. The bottom 11b of envelope 11 is preferably flat, while the sides 11c have a relatively short radius of curvature, for a purpose to be disclosed hereinbelow. Envelope sides 11c and bottom 11b are mounted in a shock mount 16, which may be made of any suitable material, such as felt or other fibrous substance. Shock mount 16 is in turn secured within a generally cup-shaped housing generally indicated at 17, which is preferably formed in two parts, namely a bottom 18 and side 19. An annular flange 20 is formed on housing bottom 18 and is complementary to a flange 21 formed on the bottom of housing side 19, these two flanges being secured together in any suitable manner to form the unitary mounting 17. The upper portion of housing side 19 is preferably crimped to provide an inwardly extending retaining flange 22, which securely holds envelope 11 and shock mount 16 within housing 17. It might also be noted that flanges 20 and 21 of housing 17 provide convenient means for seating the phototube upon installation thereof. Also, housing bottom 18 is suitably drilled to provide passage for conductors 15.

Extending perpendicularly from bottom 11b of envelope 11 is an integral glass stud 23 on which anode 12, which is preferably in the form of a cylindrical column, is mounted in a position coaxial with the envelope. The left-hand end of anode 12, as viewed in Figure 1, is supported by stud 23 adjacent envelope bottom 11b, whereas the right-hand end thereof abuts envelope top 11a and accordingly provides a support therefor to resist forces applied axially of the phototube which might otherwise fracture the envelope. The anode itself being metallic and cylindrical in form, is inherently capable of withstanding such shocks, and as tube bottom 11b rests flatly against shock mount 16 and housing bottom 18, it too is well able to withstand these forces. Also, as noted above, sides 11c of the tube envelope have a rather sharp curvature which together with the support provided by shock mount 16 renders the envelope sides substantially shatterproof from shock or vibration.

Glass supports 14 are preferably formed integrally with envelope side 11c and extend radially and inwardly therefrom toward anode 12 (Figures 1 and 2). The inner edges 14a of glass supports 14 are preferably parallel to and spaced from anode 12, so that if there is any slight relative movement between the anode and glass stud 23, there will be no danger of contact between the metal anode and glass supports. It might also be noted that supports 14 are also preferably integral with envelope bottom 11b and extend upwardly therefrom. The tops 14b of the supports are preferably flat and have extending therefrom L-shaped posts 24 which are fused in the glass and which are suitably secured as by welding to cathodes 13 to support the cathodes in proper position on supports 14. As noted before, conductors 15 are also fused within the supports and are secured to cathodes 13 so as to make good electrical connection therewith.

Cathodes 13 are formed of suitable metal, and each includes preferably a flat top 13a (Figure 4) of substantial area which, as is more clearly shown in Figure 1, is spaced from edge 14b of support 14. Cathode top 13a (Figure 3) has extending rearwardly therefrom integral, tapered stiffening flanges 13b and 13c provided with notches 25 and 26, respectively, into which the top of support 14 extends to prevent movement of the cathode transversely of its support. Flanges 13b and 13c are deepest at the central portions thereof. Hence, these flanges are generally of a cantilever construction, which provides sufficient rigidity to withstand bending forces generated by shocks imparted perpendicularly to the cathode. As may be seen in Figure 4, cathodes 13 may be generally wedge-shaped, but preferably terminate at their inner edges short of anode 12, so as to provide ample space between the anode and cathodes to preclude engagement in the event of relative movement therebetween.

It may now be seen that top 11a of the tube envelope 11 is amply supported by anode 12, that envelope sides 11c and bottom 11b are well supported by shock mount 16 and housing 17, and yet, interior leakage paths of substantial extent over the glass surface are provided. Inasmuch as supports 14 lie in planes parallel to or extending through the axis of the phototube, they are not subjected to any bending forces which might cause them to crack, but are subject only to forces of compression which they are well able to withstand. By reason of the cantilever character of cathode flanges 13b and 13c, such bending forces as the cathodes are subjected to are sufficiently resisted so that the cathodes are sustained against distortion.

Accordingly we have provided a photo-emissive tube which efficiently fulfills the objects hereinbefore referred to.

As many possible embodiments may be made of the above invention, and as many changes might be made in the embodiment above set forth, it is to be understood that all matter hereinbefore set forth, or shown in the accompanying drawing, is to be interpreted as illustrative and not in a limiting sense.

We claim:

1. A phototube comprising, a glass envelope, a rigid anode mounted within said envelope and bearing at its ends against the envelope walls to support them against collapse, a photocathode, and means mounting said cathode in said envelope adjacent said anode, said cathode having a flat top of substantial area lying in a plane passing through the axis of said anode.

2. A phototube comprising, a glass envelope, a rigid anode centrally mounted within said envelope and bearing at its ends against the envelope walls to support them against collapse, a plurality of photocathodes, and means mounting said cathodes in said envelope around said anode, said cathodes having flat tops of substantial area lying in a plane which passes through the axis of said anode.

3. A phototube comprising, a glass envelope having a relatively flat top and bottom, a rigid anode centrally mounted within said envelope and bearing at its ends against said envelope top and bottom to support them against collapse, a plurality of photocathodes, and means mounting said cathodes in said envelope about said anode, said cathodes having flat tops of substantial area lying in a plane parallel to the plane of said envelope bottom.

4. A phototube comprising, a glass envelope, a tubular rigid anode mounted within said envelope and bearing at its ends against the envelope walls to support them against collapse, one of said envelope walls including a portion projecting into said anode to maintain said anode in position within said envelope, a photocathode, and means mounting said photocathode in said envelope adjacent said anode.

5. A phototube comprising, a glass envelope, a glass support in said envelope lying in a plane passing through the axis thereof, a second glass support disposed in said envelope coaxially therewith, a planar photocathode secured to said first glass support with the plane of said cathode passing through the axis of said second glass support, and a tubular anode mounted on said second glass support adjacent said cathode and engaging the top of said envelope in supporting relation thereto.

6. A phototube comprising, a glass envelope having a bottom, an integral glass stud formed on said bottom and extending therefrom within said envelope coaxially therewith, a tubular anode mounted on said glass stud, a plurality of glass supports in said envelope, each of said supports lying in a plane passing through the axis of said anode, and a photocathode mounted on each of said supports, said cathodes all lying in a plane passing through the axis of said anode between the ends thereof.

7. A phototube comprising, a glass envelope, a plurality of glass supports integrally formed with said envelope and lying therewithin, each of said supports lying in a plane passing through the axis of said envelope, a planar photocathode mounted on each of said supports, all of said cathodes lying in a general plane passing through said axis, and an anode mounted within said envelope centrally of said cathodes with the planes of said cathodes also passing through said anode between the ends thereof.

8. A phototube comprising, a glass envelope, a glass support in said envelope lying in a plane passing through the axis thereof, a photocathode having a tapered flange depending therefrom and engaging said glass support, means secured to said glass support and mounting said cathode thereon, and an anode secured within said envelope adjacent said cathode.

9. A phototube comprising, a housing, a glass envelope having a flat bottom and a relatively flat top, means forming a shock mount between said housing and the bottom and sides of said envelope, and an anode and photocathode mounted within said envelope, said anode being rigid and bearing at its ends against the top and bottom of said envelope to support them against collapse.

10. A phototube comprising, a glass envelope having integral sides, top and bottom, an elongated rigid anode mounted within said envelope coaxially therewith and supporting said top and bottom, a plurality of flat photocathodes, and means mounting said cathodes in said envelope around said anode with said cathodes lying in a plane normal to the axis of said anode.

CURTIS HILLYER, JR.
HENRY BLACKSTONE.